United States Patent [19]

Yamaguchi

[11] Patent Number: 4,955,700
[45] Date of Patent: Sep. 11, 1990

[54] SMALL-SIZE ZOOM LENS SYSTEM
[75] Inventor: Takao Yamaguchi, Yokohama, Japan
[73] Assignee: Ricoh Company, Ltd., Tokyo, Japan
[21] Appl. No.: 398,915
[22] Filed: Aug. 28, 1989
[30] Foreign Application Priority Data
 Aug. 30, 1988 [JP] Japan .................. 63-215967
[51] Int. Cl.$^5$ .................. G02B 15/15; G02B 9/64
[52] U.S. Cl. .................. 350/423
[58] Field of Search .................. 350/423, 427
[56] References Cited
FOREIGN PATENT DOCUMENTS
 0159614 12/1981 Japan .................. 350/423

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A small-size zoom lens system includes a first lens group, a second lens group, and a third lens group which are successively arranged from an object side to an image side. The first, second, and third lens groups have negative, positive, and negative focal lengths, respectively. The first, second, and third lens groups are movable toward the object side for zooming movement from a wide angle end toward a telephoto end, while varying the distances between the first, second, and third lens groups. The focal length of the ith lens group (i=1, 2, 3), and the focal length fw of the entire zoom lens system at the wide angle end of zooming movement satisfy the following conditions:

$0.3 < |f_3|/|f_1| < 1$ $1.2 < |f_1|/fw < 2.3$ $0.9 < |f_3|/fw < 1.4$

8 Claims, 8 Drawing Sheets

SMALL-SIZE ZOOM LENS SYSTEM

BACKGROUND OF THE INVENTION

The present invention relates to a small-size zoom lens system, and more particularly to a small-size zoom lens system which can be used in a camera or an electronic video camera, such as a compact lens shutter camera, that does not require a long back focus.

Most widely used zoom lenses for cameras which require no long back focus are a two-group zoom lens system which includes a first lens group having a positive focal length and a second lens group having a negative focal length in view of the fact that the entire length of the lens system is reduced at a wide angle setting.

There has also been proposed a three-group zoom lens system which comprises a first lens group having a positive focal length, a second lens group having a negative focal length, and a third lens group having a positive focal length.

The two-group zoom lens is made compact at the wide angle setting. However, since the first lens group generally has a diaphragm, $F_{NO}$ of the lens is increased at a telephoto setting. If the magnification ratio is increased, the zoom lens will become extremely dark.

The three-group zoom lens system which has been proposed is bright unlike the two-group lens system, but is not compact in size.

Japanese Laid-Open Patent Publication No. 63-25613 discloses a three-group zoom lens of improved compactness. The disclosed zoom lens, however, cannot have a large magnification ratio because its first group lens is fixed when the power of the zoom lens is varied. Actually, the maximum magnification ratio disclosed in this publication is 2.1.

SUMMARY OF THE INVENTION

It is therefore an object of the present invention to provide a small-size zoom lens system which includes a wide angle range up to a half angle of view of about 31°, has a magnification ratio of about 3 and small $F_{NO}$ in a telephoto range, and is compact in overall length and diameter in all ranges from wide angle to telephoto settings.

According to the present invention, a small-size zoom lens system comprises a first lens group, a second lens group, and a third lens group which are successively arranged from an object side to an image side, the first, second, and third lens groups having negative, positive, and negative focal lengths, respectively, the first, second, and third lens groups being movable toward the object side for zooming movement from a wide angle end toward a telephoto end, while varying the distances between the first, second, and third lens groups, the focal length of the ith lens group (i=1, 2, 3), and the focal length fw of the entire zoom lens system at the wide angle end of zooming movement satisfying the following conditions:

$$0.3 < |f_3|/|f_1| < 1$$

$$1.2 < |f_1|/fw < 2.3$$

$$0.9 < |f_3|/fw < 1.4$$

With this arrangement, the zoom lens system has a wide angle range, is of a high magnification ratio, bright, and compact in overall length and diameter in all ranges from wide angle to telephoto ranges.

The above and other objects, features and advantages of the present invention will become more apparent from the following description when taken in conjunction with the accompanying drawings in which preferred embodiments of the present invention are shown by way of illustrative example.

GENERAL DESCRIPTION OF THE INVENTION

Figure 1:
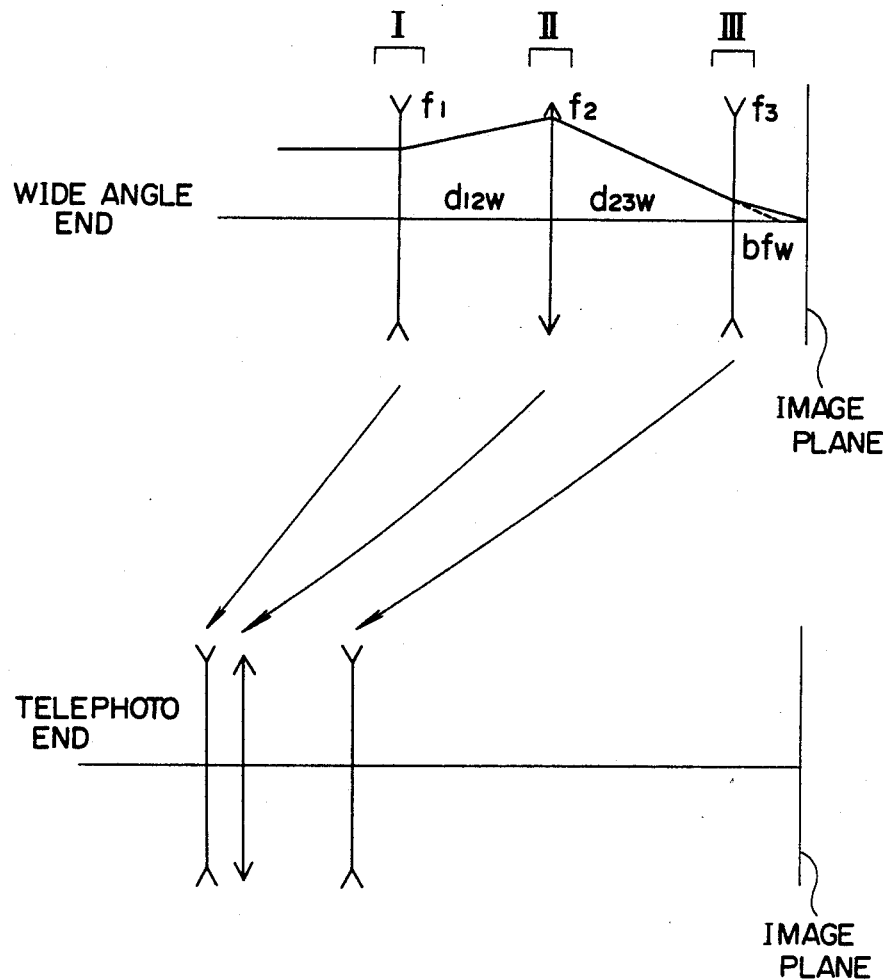
FIG. 1 is a schematic view illustrative of the principles of the present invention.

A small-size zoom lens system according to the present invention is a three-group zoom lens system comprising a first lens group I, a second lens group II, and a third lens group III, as shown in FIG. 1, which are successively arranged from an object side to an image side. The first lens group I has a negative focal length, the second lens group II a positive focal length, and the third lens group III a negative focal length. The first, second, and third lens groups I, II, III are movable toward the object side for zooming movement from a wide angle setting toward a telephoto setting, while varying the distances between the first, second, and third lens groups.

The focal length of the ith lens group (i=1, 2, 3), and the focal length fw of the entire zoom lens system at the wide angle end of zooming movement satisfy the following conditions:

$$0.3 < |f_3|/|f_1| < 1 \qquad (1)$$

$$1.2 < |f_1|/fw < 2.3 \qquad (2)$$

$$0.9 < |f_3|/fw < 1.4 \qquad (3)$$

The first lens group is a negative lens system because it is placed in front of the second lens group which is a positive master lens group and the distance between the first and second lens groups is varied when the power of the zoom lens system is varied, thus varying the apparent diameter of the diaphragm aperture in the master lens group, i.e., the diameter of the entrance pupil thereby to reduce $F_{NO}$ at a telephoto setting. Although the first and second lens groups are spaced apart from each other at the wide angle end, the lens diameter is small since the first lens group is the negative lens group. The first and second lens groups constitute a two-group zoom lens of the retrofocus type suitable for the wide angle setting, and are partly responsible for varying the power of the zoom lens system.

The third lens group is a negative lens system because, inasmuch as the combined system of the first lens group which is negative and the second lens group which has a negative lateral magnification has a positive focal length, the third lens group is placed behind the first and second lens groups, forming the entire lens system into a telephoto type configuration. This arrangement is highly effective in making the lens system compact. When the lens system is zoomed from the wide angle setting toward the telephoto setting, the third lens group quickly moves toward the combined first and second lens group system, thereby largely varying the lateral magnification and increasing the magnification ratio of the entire lens system.

The first and third lens groups combined with the master lens group reduce $F_{NO}$ at the telephoto setting and make the entire lens system compact by satisfying the above conditions (1) through (3).

It is assumed that the distance between the principal points of the first and second lens groups is represented by $d_{12}$, the distance between the third lens group and the image plane, i.e., the back focus, by bf, the focal length of the entire lens system by f, the refractive index of the ith lens group (i=1, 2, 3) by $\phi_i$ ($=1/fi$), and the refractive index of the entire lens system by $\phi$ ($=1/f$). Then, these parameters are related to each other as follows:

$$\phi_3 = (1/bf)[1-(1/\phi)\{\phi_1(1-d_{12}\phi_2)+\phi_2\}]$$

When $d_{12} < (1/\phi_2)$, the refractive indexes $\phi_3$, $\phi_1$ are inversely proportional to each other.

Based on the above relationship, the condition (1) determines the relationship between the refracting powers of the first and third lens groups. If the upper limit of the condition (1) were exceeded, then $F_{NO}$ at the telephoto setting would be reduced, but the compactness would not be achieved. If the lower limit were exceeded, then the lens system would be made compact, but would be analogous to a zoom lens having two positive and negative lens groups, resulting in large $F_{NO}$ at the telephoto setting.

The conditions (2) and (3) serve to place limitations on $f_1$, $f_3$ under the condition (1). If the upper limit of the condition (2) were exceeded, then the effect of using the negative lens system as the first lens group would be lost, increasing $F_{NO}$ at the telephoto setting, and the combined refractive index of the first and second lens groups would be increased and the lateral magnification of the third lens group would be increased, so that the third lens group would be required to move a large stroke when varying the power, thus failing to keep the desired group-to-group distances at the telephoto setting. If the lower limit of the condition (2) were exceeded, then the distance between the second and third lens groups would be increased at the wide angle setting, resulting in either an increased diameter of the third lens group or a reduction in the brightness of the edge of the image field.

If the upper limit of the condition (3) were exceeded, then the telephoto effect of the zoom lens system would be lowered, and the zoom lens system would be less compact. If the lower limit of the condition (3) were exceeded, then the Petzval sum of the entire zoom lens system would be reduced, and it would be difficult to provide a suitable image plane with its center and peripheral edge being well balanced.

In order for the small-size zoom lens system of the present invention to vary the power or magnification efficiently, it is preferable to satisfy the following conditions as well as the above conditions (1) through (3):

The distance $d_{12}w$ between the principal points of the first and second lens groups at the wide angle setting, and the distance $d_{23}w$ between the principal points of the second and third lens groups at the wide angle setting should preferably satisfy the following conditions:

$$d_{12}w/f_2 < 1 \qquad (4)$$

$$d_{23}w/fw < 0.85 \qquad (5)$$

The condition (4) means that the distance between the first and second lens groups at the wide angle setting is set to a value smaller than a certain distance. This condition is largely related to the refracting power at the focal length $f_3$, and is described by $d_{12}w$, the back focus, and the relationship between the refracting powers of the respective lens groups. If the combined refracting power of the first and second lens groups at the wide angle setting is represented by $\phi_{12}w$, the back focus at the wide angle setting by bfw, and the refracting power of the entire lens system at the wide angle setting by $\phi w$, these parameters are related to each other according to the following equation:

$$|f_3| = |bfw/[1-\{(\phi_1+\phi_2-d_{12}w\cdot\phi_1\cdot\phi_2)/\phi w\}]|$$

In a lens system whose entire length is to be reduced by shortening the back focus, the value $|f_3|$ is reduced if the back focus bfw is reduced. If $d_{12}w$ were increased beyond the range of the condition (4), then the value $|f_3|$ would be further reduced as can be seen from the above equation, it would become difficult to keep the Petzval sum of the entire lens system in an appropriate range, and the diameter of the first lens group at the wide angle setting would be increased.

The condition (5) defines the distance between the second and third lens groups at the wide angle setting, and has the same effects as those of the condition (4). If the condition (5) were not met, then the height of light rays through the third lens group at the wide angle setting would be increased, so that either the diameter of the third lens group would be increased or the brightness of the edge of the image field would be lowered.

The above conditions are relied upon to achieve the desired object at a paraxial level.

For more compactness and desired performance with specific lens designs, it is preferable to construct the zoom lens system as follows:

The first lens group is constructed of negative and positive lenses arranged successively in that order from the object side. The negative lens comprises a double-concave lens or a meniscus lens having stronger refracting power on its lens surface opposite to the object side. The positive lens comprises a meniscus lens having a convex surface directed toward the object side. The Abbe number $\nu_{1N}$ of the negative lens and the Abbe number $\nu_{1P}$ of the positive lens are related to meet the following relationship:

$$\nu_{1N} - \nu_{1P} > 17 \qquad (6)$$

The negative and positive lenses which are basically of a meniscus configuration are successively arranged because the combined principal point of the first lens group is positioned more closely to the second lens group by placing the principal points of the negative and positive lenses closely to each other or reversing these principal points. With this arrangement, the distance between the first and second lens groups is maintained, and a high magnification ratio is achieved.

If the positive and negative lenses were successively arranged in that order from the object side, then the combined principal point would be displaced excessively toward the second lens group, and the first and second lens groups would be spaced apart from each other, resulting in an increase in the diameter and the overall length of the zoom lens system.

If the negative and positive lenses of the first lens group are successively arranged in that order from the object side, then transverse chromatic aberration is generated at the negative lens in such a direction that it cannot sufficiently be corrected. The condition (6) serves to prevent the generation of such chromatic aberration as much as possible with the first lens group. If the Abbe numbers $\nu_{1N}$, $\nu_{1P}$ were close to each other beyond the range of the condition (6), the aberration would not sufficiently be corrected in the first lens group, and would not be covered by the second and third lens groups.

A high-magnification zoom lens which is basically of the telephoto type, as with the present invention, has its back focus increased as the zoom lens is zoomed toward the telephoto end, tending to develop a large change in the transverse chromatic aberration. In addition to the condition (6) above, the third lens group is constructed of first positive, second negative, and third negative lenses which are successively arranged in that order from the object side, and the third negative lens of the third lens group comprises a doublet composed of a negative lens and a positive lens. The Abbe number $\nu_{3N}$ of the negative lens of the doublet and the Abbe number $\nu_{3P}$ of the positive lens of the doublet are related as follows:

$$\nu_{3N} > \nu_{3P} \quad (7)$$

This arrangement makes it possible for the cemented surface of the doublet to control the transverse chromatic aberration, which tends to be excessively corrected at the telephoto setting, in such a manner that the chromatic aberration will be insufficiently corrected.

DESCRIPTION OF THE PREFERRED EMBODIMENTS

Four specific embodiments will hereinafter be described below.

In each of the embodiments, f denotes the focal length of the entire zoom lens system, $\omega$ the angle of view, ri the paraxial radius of curvature of the ith lens surface, di the ith surface-to-surface distance as counted from the object side, and nj, $\nu j$ the refractive index and Abbe number, respectively, of the jth lens as counted from the object side.

If the ith lens surface as counted from the object side is aspherical, then the aspherical surface is expressed by:

$$z = (1/ri) \cdot y^2 / [1 + \sqrt{1 - (1 + ki)(1/ri^2)y^2}\,] + Ai y^4 + Bi y^6 + Ci y^8$$

where z indicates the direction of the optical axis and y a direction normal to the optical axis, with the origin at the intersection of the lens surface and the optical axis.

The aspherical surface is thus defined by the paraxial radius ri of curvature, the conical constant ki, and the higher-order aspherical coefficients Ai, Bi, Ci.

Figure 2:
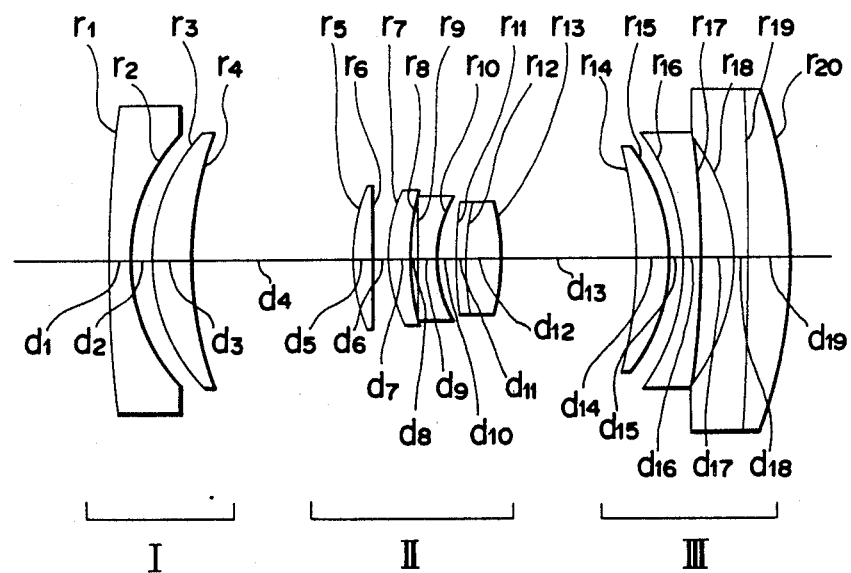
FIG. 2 is a schematic side elevational view of a zoom lens of Examples 1 through 3 of the present invention.

The zoom lens system according to each of Embodiments 1 through 3 is a 11-element lens system as shown in FIG. 2, with two image-size lenses in each of the second and third lens groups II, III serving as a doublet.

Figure 3:
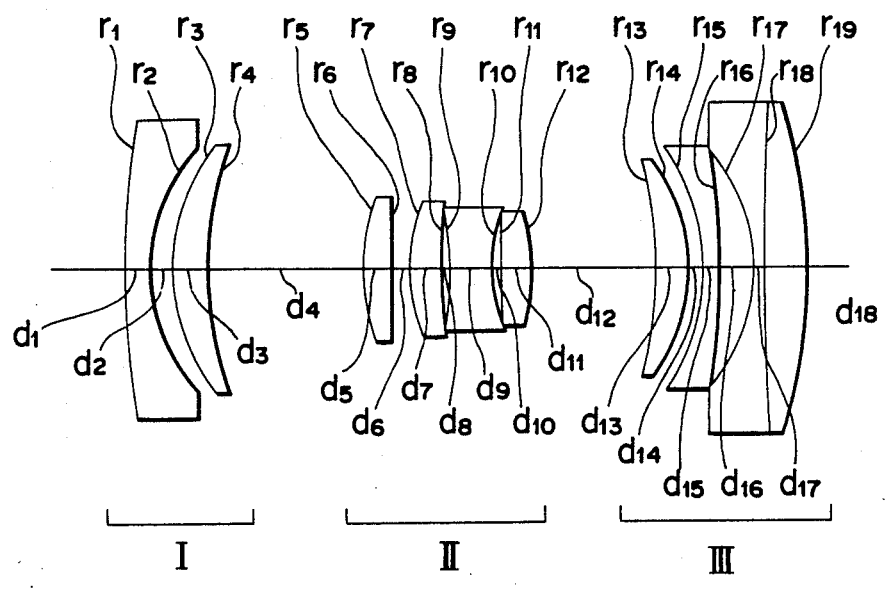
FIG. 3 is a schematic side elevational view of a zoom lens of Example 4 of the present invention.
Figure 3A:
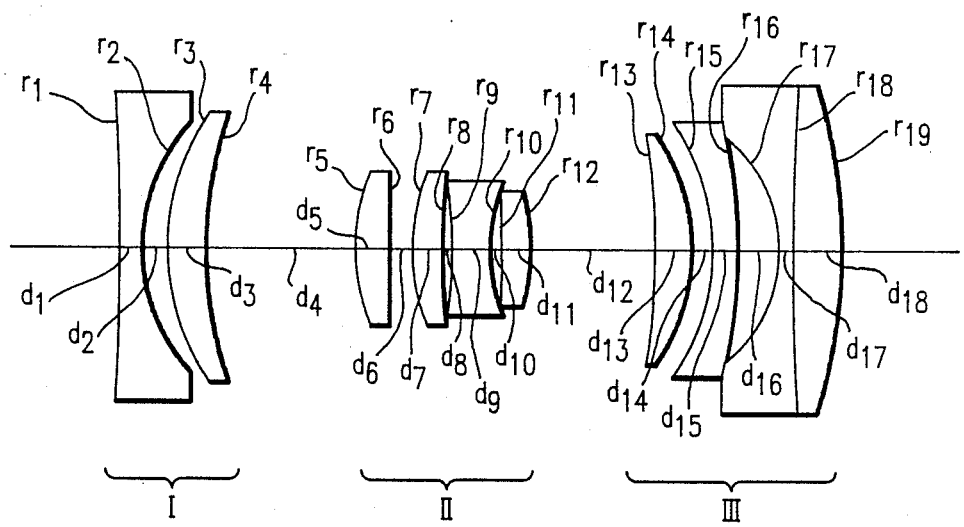
FIG. 3(A) is a schematic side elevational view of a zoom lens corresponding to the second embodiment of the present invention.

The zoom lens system according to Embodiment 4 is a 10-element lens system as shown in FIG. 3, with two image-side lenses in the third lens group III serving as a doublet.

The lens groups in FIGS. 2 and 3 are shown as being positioned at the wide angle setting.

Embodiment 1:
$f = 36 \sim 102$, $F_{NO} = 3.62 \sim 8.6$, $\omega = 61.3 \sim 23.6°$

| i | ri | di | j | nj | $\nu j$ |
|---|---|---|---|---|---|
| 1 | 95.599 | 2.129 | 1 | 1.69100 | 54.7 |
| 2 | 17.241 | 2.351 | | | |
| 3 | 17.480 | 3.352 | 2 | 1.67270 | 32.2 |
| 4 | 30.883 | Variable | | | |
| 5 | 17.921 | 1.841 | 3 | 1.62041 | 60.3 |
| 6 | −8268.438 | 0.840 | | | |
| 7 | 14.245 | 2.173 | 4 | 1.71300 | 53.9 |
| 8 | 25.383 | 0.930 | | | |
| 9 | 167.192 | 1.895 | 5 | 1.90315 | 29.8 |
| 10 | 12.594 | 1.635 | | | |
| 11 | 33.190 | 1.000 | 6 | 1.72000 | 42.0 |
| 12 | 23.610 | 3.479 | 7 | 1.56384 | 60.8 |
| 13 | −21.044 | Variable | | | |
| 14 | −40.442 | 3.019 | 8 | 1.68893 | 31.2 |
| 15 | −17.575 | 1.582 | | | |
| 16 | −20.335 | 1.578 | 9 | 1.80420 | 46.5 |
| 17 | −81.264 | 3.200 | | | |
| 18 | −19.706 | 1.368 | 10 | 1.77250 | 49.6 |
| 19 | −445.603 | 4.000 | 11 | 1.80518 | 25.5 |
| 20 | −49.346 | | | | |

$A_3 = -5.158664 \cdot 10^{-6}$, $B_3 = -1.196627 \cdot 10^{-8}$
$C_3 = -8.160832 \cdot 10^{-11}$
$A_6 = 4.323470 \cdot 10^{-6}$, $B_6 = 3.205270 \cdot 10^{-8}$
$C_6 = -4.056801 \cdot 10^{-11}$
$A_{10} = 1.400542 \cdot 10^{-5}$, $B_{10} = 1.046080 \cdot 10^{-7}$
$C_{10} = -3.696680 \cdot 10^{-10}$
$k_{20} = -2.358774$
$A_{20} = -1.452339 \cdot 10^{-6}$, $B_{20} = -3.241783 \cdot 10^{-9}$
$C_{20} = 6.420707 \cdot 10^{-12}$

| f | 36 | 60.6 | 102 |
|---|---|---|---|
| $d_4$ | 16.293 | 10.193 | 0.593 |
| $d_{13}$ | 13.162 | 4.462 | 1.254 |

$|f_3|/|f_1| = 0.524$, $|f_1|/fw = 1.944$,
$|f_3|/fw = 1.018$, $d_{12w}/f_2 = 0.827$, $d_{23w}/fw = 0.777$,
$\nu_{1N} - \nu_{1P} = 22.5$

Embodiment 2:
$f = 36 \sim 102$, $F_{NO} = 3.83 \sim 8.83$, $\omega = 63.7 \sim 23.8°$

| i | ri | di | j | nj | $\nu j$ |
|---|---|---|---|---|---|
| 1 | −1615.032 | 1.800 | 1 | 1.69680 | 55.5 |
| 2 | 17.301 | 1.922 | | | |
| 3 | 19.202 | 3.200 | 2 | 1.67270 | 32.2 |
| 4 | 49.928 | Variable | | | |
| 5 | 18.164 | 1.941 | 3 | 1.61765 | 55.2 |
| 6 | 1456.344 | 0.840 | | | |
| 7 | 13.835 | 2.082 | 4 | 1.71300 | 53.9 |
| 8 | 27.062 | 0.930 | | | |
| 9 | 235.083 | 1.851 | 5 | 1.90315 | 29.8 |
| 10 | 12.815 | 1.635 | | | |
| 11 | 32.025 | 1.000 | 6 | 1.72000 | 42.0 |
| 12 | 23.905 | 3.523 | 7 | 1.56873 | 63.1 |
| 13 | −21.385 | Variable | | | |
| 14 | −44.416 | 3.321 | 8 | 1.68893 | 31.2 |
| 15 | −19.072 | 1.740 | | | |
| 16 | −21.429 | 1.736 | 9 | 1.80610 | 33.3 |
| 17 | −105.137 | 3.520 | | | |
| 18 | −17.810 | 1.505 | 10 | 1.77250 | 49.6 |
| 19 | 248.675 | 4.400 | 11 | 1.80518 | 25.5 |
| 20 | −36.349 | | | | |

$A_3 = -2.376233 \cdot 10^{-7}$, $B_3 = -2.579716 \cdot 10^{-9}$

-continued $C_3 = 3.429180 \cdot 10^{-11}$
$A_6 = 4.699367 \cdot 10^{-6}$, $B_6 = 3.291958 \cdot 10^{-8}$
$C_6 = -8.976583 \cdot 10^{-11}$
$A_{10} = 1.460537 \cdot 10^{-5}$, $B_{10} = 8.132965 \cdot 10^{-8}$
$C_{10} = -1.976304 \cdot 10^{-9}$

| f | 36 | 60.6 | 102 |
|---|---|---|---|
| $d_4$ | 17.608 | 10.507 | 0.608 |
| $d_{13}$ | 10.685 | 3.605 | 2.053 |

$|f_3|/|f_1| = 0.677$, $|f_1|/fw = 1.583$,
$|f_3|/fw = 1.072$, $d_{12w}/f_2 = 0.98$, $d_{23w}/fw = 0.681$,
$\nu_{1N} - \nu_{1P} = 23.3$

Embodiment 3:
$f = 36 \sim 102$, $F_{NO} = 3.63 \sim 8.64$, $\omega = 61.4 \sim 23.6°$

| i | ri | di | j | nj | νj |
|---|---|---|---|---|---|
| 1 | 116.305 | 2.129 | 1 | 1.71700 | 48.0 |
| 2 | 18.067 | 2.230 | | | |
| 3 | 18.281 | 3.352 | 2 | 1.71736 | 29.5 |
| 4 | 32.856 | Variable | | | |
| 5 | 17.586 | 1.841 | 3 | 1.61272 | 58.6 |
| 6 | 49077.534 | 0.840 | | | |
| 7 | 14.205 | 1.982 | 4 | 1.71300 | 53.9 |
| 8 | 25.661 | 0.930 | | | |
| 9 | 136.444 | 1.818 | 5 | 1.90315 | 29.8 |
| 10 | 12.628 | 1.635 | | | |
| 11 | 33.200 | 1.000 | 6 | 1.72342 | 38.0 |
| 12 | 21.383 | 3.545 | 7 | 1.56883 | 56.0 |
| 13 | −22.085 | Variable | | | |
| 14 | −40.514 | 3.019 | 8 | 1.68893 | 31.2 |
| 15 | −17.486 | 1.582 | | | |
| 16 | −20.092 | 1.578 | 9 | 1.78590 | 43.9 |
| 17 | −72.163 | 3.200 | | | |
| 18 | −18.748 | 1.368 | 10 | 1.77250 | 49.6 |
| 19 | −210.607 | 4.000 | 11 | 1.80518 | 25.5 |
| 20 | −48.561 | | | | |

$A_3 = -5.358285 \cdot 10^{-6}$, $B_3 = -7.184374 \cdot 10^{-8}$
$C_3 = -8.258085 \cdot 10^{-11}$
$A_6 = 4.461813 \cdot 10^{-6}$, $B_6 = 2.987908 \cdot 10^{-8}$
$C_6 = -3.558292 \cdot 10^{-11}$
$A_{10} = 1.428385 \cdot 10^{-5}$, $B_{10} = 1.034058 \cdot 10^{-7}$
$C_{10} = -1.487283 \cdot 10^{-10}$
$k_{20} = -1.390371$
$A_{20} = -9.233439 \cdot 10^{-7}$, $B_{20} = 4.743627 \cdot 10^{-9}$
$C_{20} = -2.014885 \cdot 10^{-11}$

| f | 36 | 60.6 | 102 |
|---|---|---|---|
| $d_4$ | 16.394 | 10.294 | 0.694 |
| $d_{13}$ | 13.091 | 4.391 | 1.183 |

$|f_3|/|f_1| = 0.524$, $|f_1|/fw = 1.944$,
$|f_3|/fw = 1.018$, $d_{12w}/f_2 = 0.827$, $d_{23w}/fw = 0.777$,
$\nu_{1N} - \nu_{1P} = 18.5$

Embodiment 4:
$f = 36 \sim 102$, $F_{NO} = 3.52 \sim 8.32$, $\omega = 59.1 \sim 23.6°$

| i | ri | di | j | nj | νj |
|---|---|---|---|---|---|
| 1 | 96.761 | 2.129 | 1 | 1.69680 | 55.5 |
| 2 | 17.060 | 2.351 | | | |
| 3 | 18.820 | 3.500 | 2 | 1.67270 | 32.2 |
| 4 | 37.042 | Variable | | | |
| 5 | 20.385 | 2.813 | 3 | 1.62041 | 60.3 |
| 6 | −1154.963 | 0.900 | | | |
| 7 | 16.128 | 3.110 | 4 | 1.58913 | 61.3 |
| 8 | 69.929 | 0.878 | | | |
| 9 | −50.769 | 3.922 | 5 | 1.90315 | 29.8 |
| 10 | 15.266 | 1.038 | | | |
| 11 | 41.805 | 2.866 | 6 | 1.74100 | 52.6 |
| 12 | −21.538 | Variable | | | |
| 13 | −40.619 | 3.019 | 7 | 1.69895 | 30.1 |
| 14 | −17.752 | 1.582 | | | |
| 15 | −20.782 | 1.578 | 8 | 1.80420 | 46.5 |
| 16 | −59.219 | 3.200 | | | |
| 17 | −18.124 | 1.368 | 9 | 1.77250 | 49.6 |
| 18 | 381.266 | 4.000 | 10 | 1.80518 | 25.5 |
| 19 | −54.024 | | | | |

$A_3 = 1.513511 \cdot 10^{-8}$, $B_3 = -1.587303 \cdot 10^{-8}$
$C_3 = 1.237589 \cdot 10^{-10}$
$A_{10} = 5.098179 \cdot 10^{-7}$, $B_{10} = 9.475583 \cdot 10^{-9}$
$C_{10} = 2.326528 \cdot 10^{-10}$
$A_{12} = -6.133352 \cdot 10^{-7}$, $B_{12} = 8.455026 \cdot 10^{-9}$
$C_{12} = -2.026614 \cdot 10^{-10}$

| f | 36 | 60.6 | 102 |
|---|---|---|---|
| $d_4$ | 15.402 | 9.302 | 0.702 |
| $d_{12}$ | 12.142 | 3.765 | 0.333 |

$|f_3|/|f_1| = 0.529$, $|f_1|/fw = 1.889$,
$|f_3|/fw = 1.00$, $d_{12w}/f_2 = 0.83$, $d_{23w}/fw = 0.782$,
$\nu_{1N} - \nu_{1P} = 23.3$

Figure 4A:
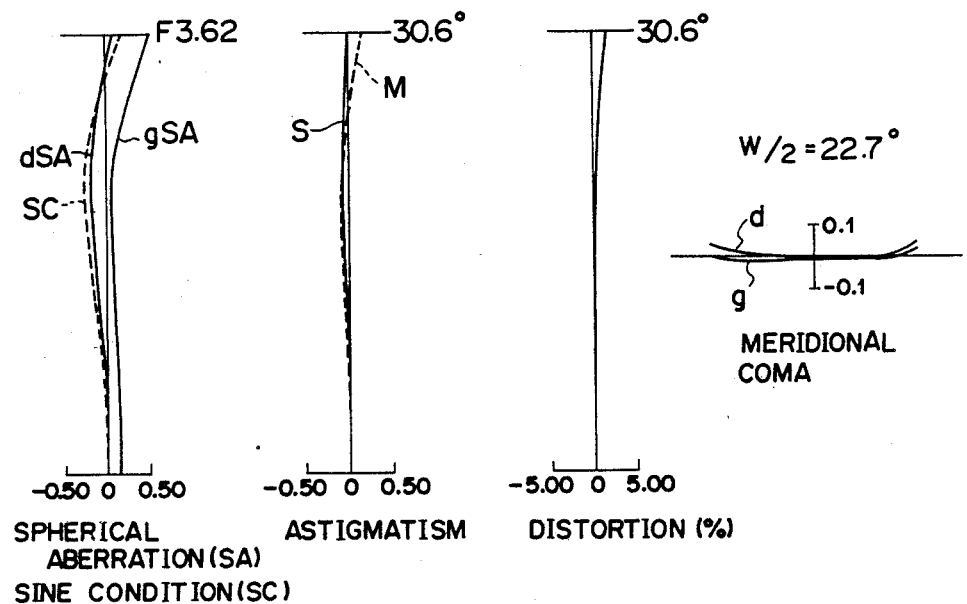
FIGS. 4(A) through 4(C) are diagrams of aberrations of Embodiment 1.
Figure 4B:
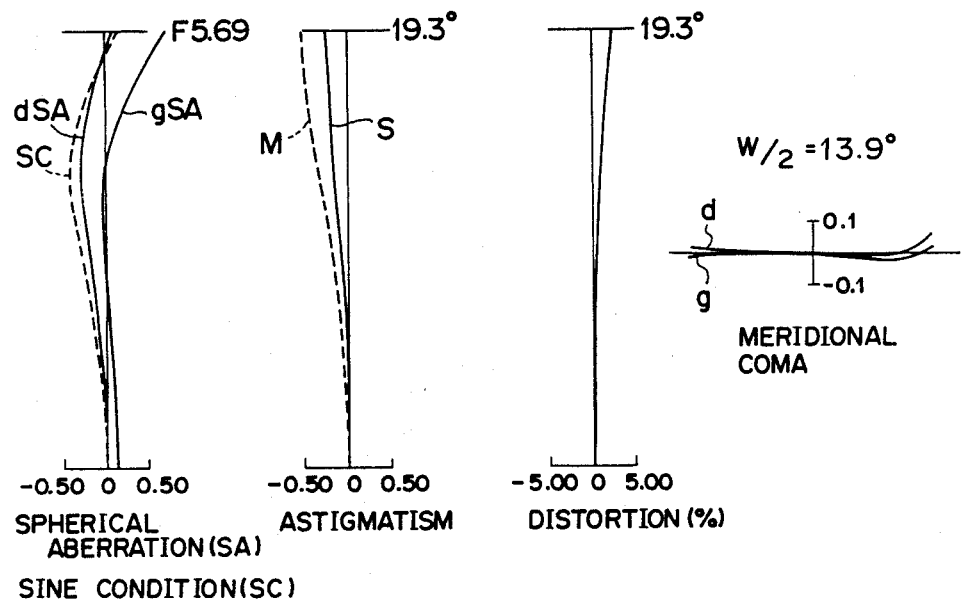
Figure 4C:
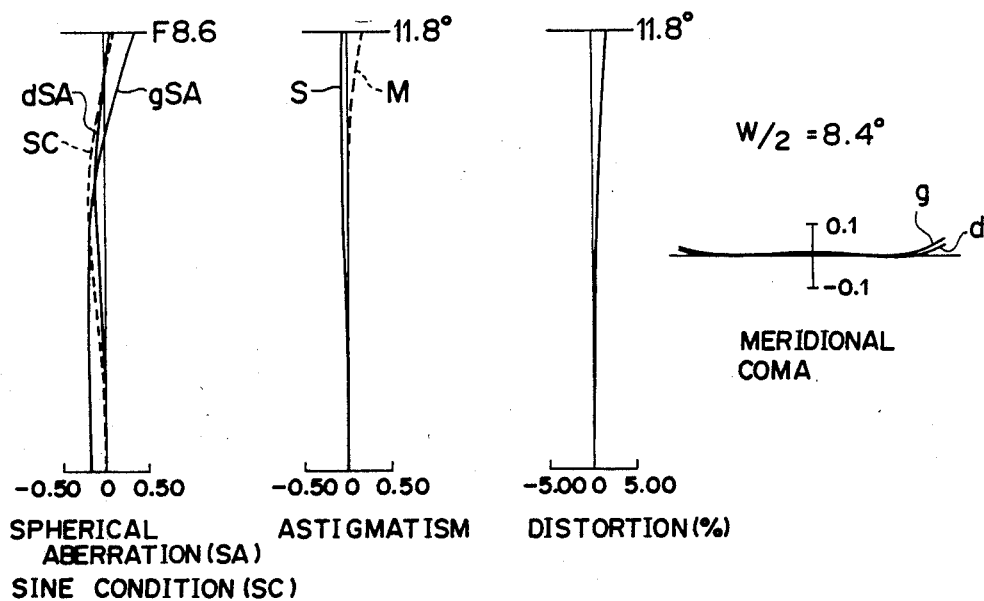
Figure 5A:
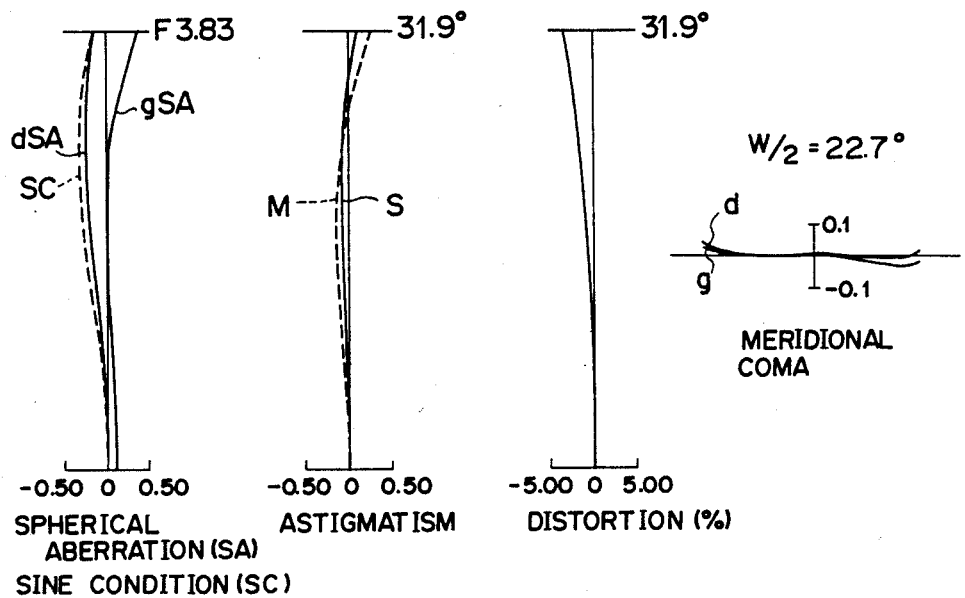
FIGS. 5(A) through 5(C) are diagrams of aberrations of Embodiment 2.
Figure 5B:
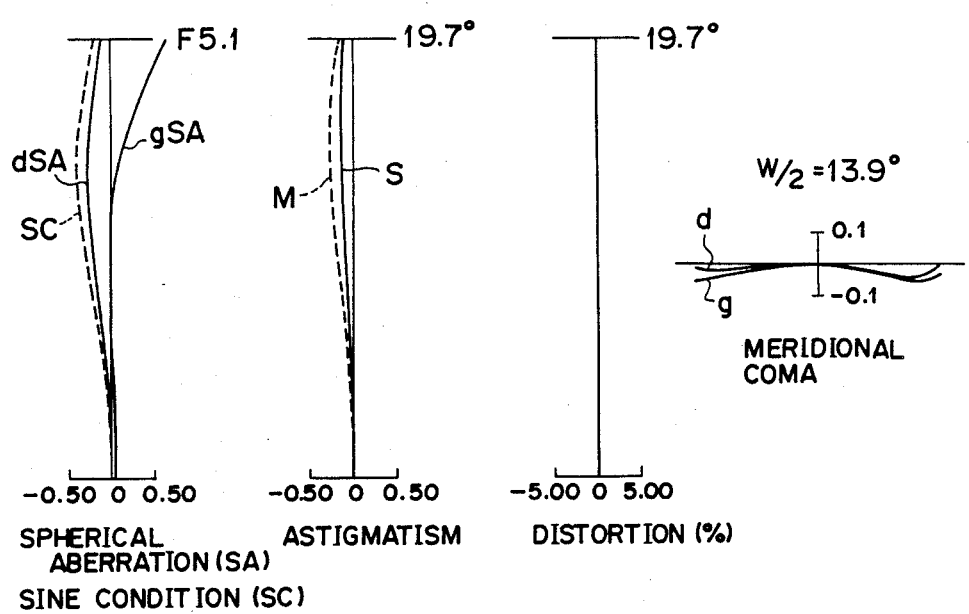
Figure 5C:
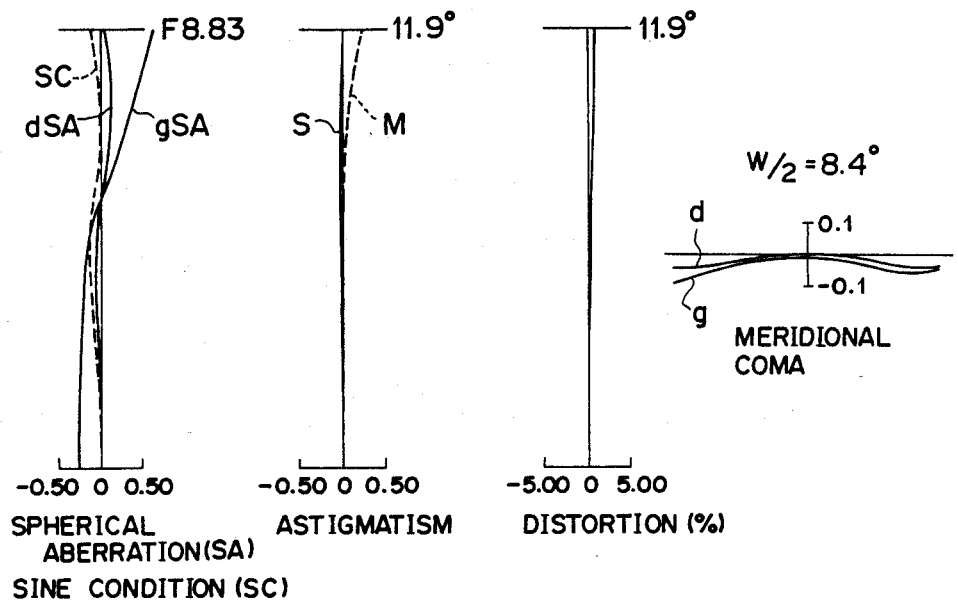
Figure 6A:
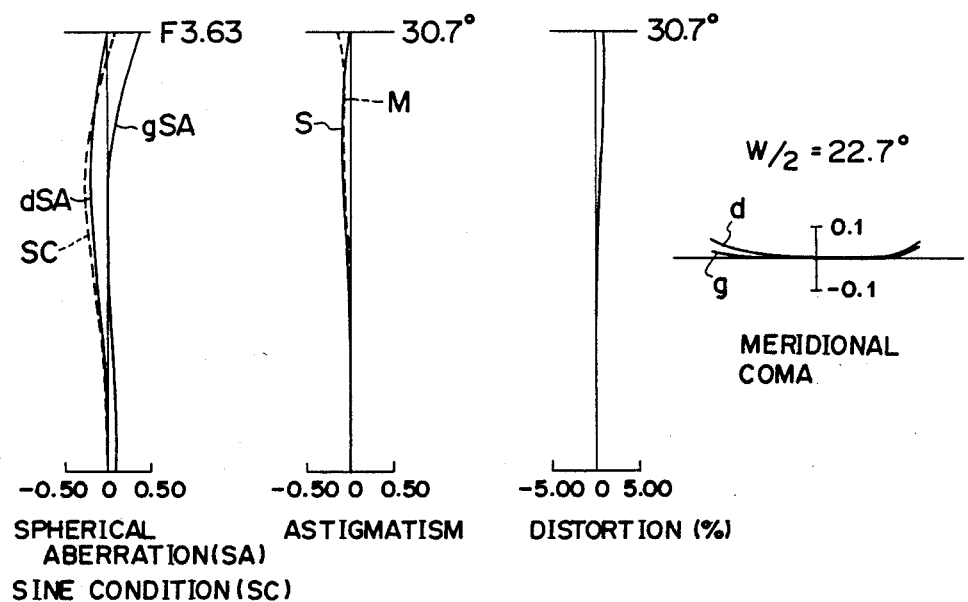
FIGS. 6(A) through 6(C) are diagrams of aberrations of Embodiment 3.
Figure 6B:
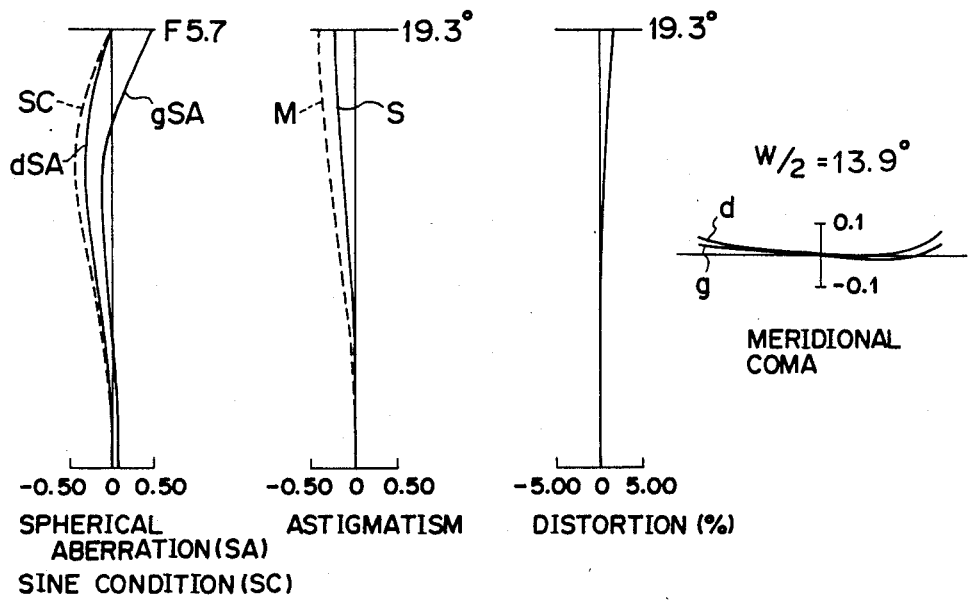
Figure 6C:
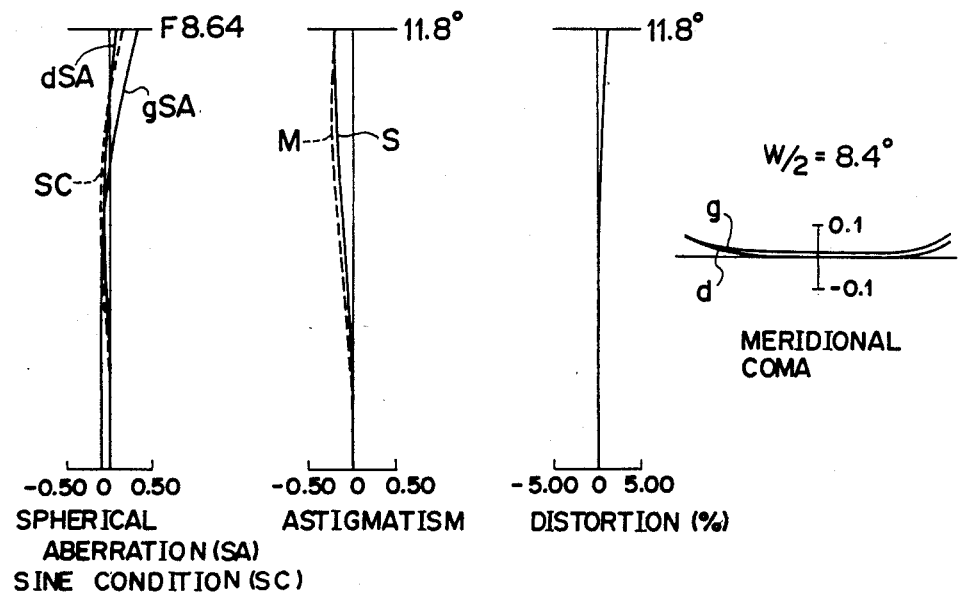
Figure 7A:
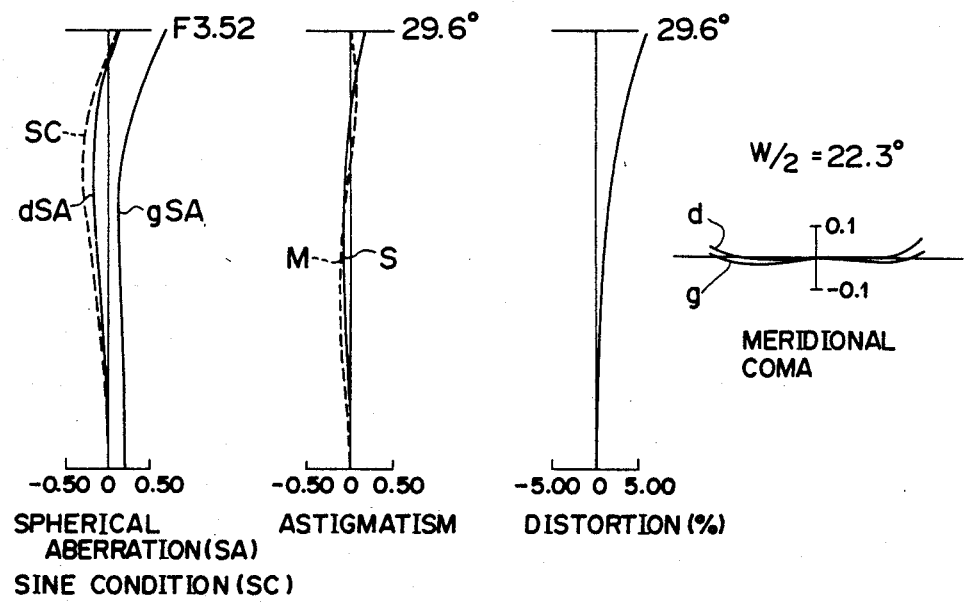
FIGS. 7(A) through 7(C) are diagrams of aberrations of Embodiment 4.
Figure 7B:
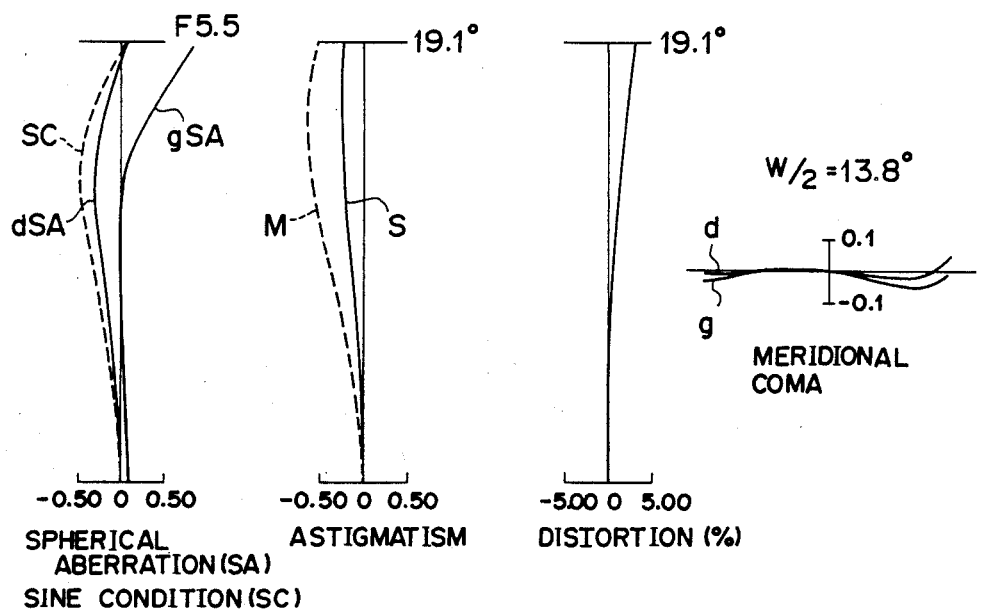
Figure 7C:
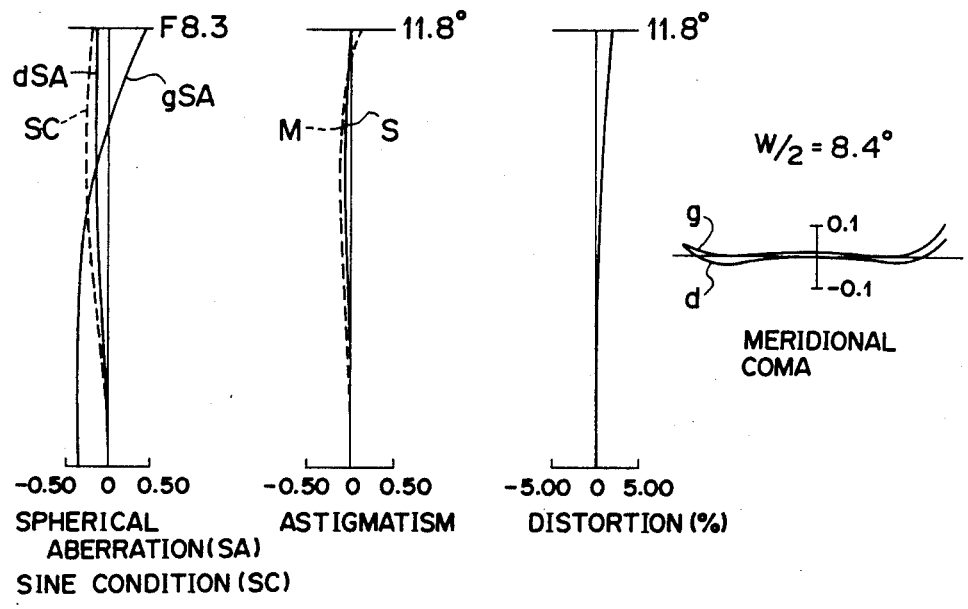

The aberrations of Embodiment 1 are shown in FIGS. 4(A) through 4(C), the aberrations of Embodiment 2 in FIGS. 5(A) through 5(C), the aberrations of Embodiment 3 in FIGS. 6(A) through 6(C), and the aberrations of Embodiment 4 in FIGS. 7(A) through 7(C). FIGS. 4(A), 5(A), 6(A), and 7(A) show aberrations at the wide angle end, FIGS. 4(B), 5(B), 6(B), and 7(B) show aberrations at the intermediate focal length, and FIGS. 4(C), 5(C), 6(C), and 7(C) show aberrations at the telephoto end. Denoted at dSA is the spherical aberration at d-line, gSA the spherical aberration at g-line, SC the sine condition, S the sagittal image plane at d-line, and M the meriodinal image plane at d-line.

Although certain preferred embodiments have been shown and described, it should be understood that many changes and modifications may be made therein without departing from the scope of the appended claims.

What is claimed is:

1. A small-size zoom lens system comprising:
a first lens group, a second lens group, and a third lens group which are successively arranged from an object side to an image side;
said first, second, and third lens groups having negative, positive, and negative focal lengths, respectively;
said first, second, and third lens groups being movable toward the object side for zooming movement from a wide angle end toward a telephoto end, while varying the distances between the first, second, and third lens groups;
the focal length of the ith lens group (i=1, 2, 3), and the focal length fw of the entire zoom lens system at the wide angle end of zooming movement satisfying the following conditions:

$0.3 < |f_3|/|f_1| < 1$ $1.2 < |f_1|/fw < 2.3$ $0.9 < |f_3|/fw < 1.4$

2. A small-size zoom lens system comprising:
a first lens group, a second lens group, and a third lens group which are successively arranged from an object side to an image side;
said first, second, and third lens groups having negative, positive, and negative focal lengths, respectively;
said first, second, and third lens groups being movable toward the object side for zooming movement from a wide angle end toward a telephoto end, while varying the distances therebetween; and
the focal length of the ith lens group (i=1, 2, 3), and the focal length fw of the entire zoom lens system at the wide angle end of zooming movement satisfying the following conditions:

$0.3 < |f_3|/|f_1| < 1$ $1.2 < |f_1|/fw < 2.3$ $$0.9 < |f_3|/fw < 1.4$$

the distance $d_{12}w$ between the principal points of said first and second lens groups at a wide angle setting, and the distance $d_{23}w$ between the principal points of said second and third lens groups at the wide angle setting, satisfying the following conditions:

$$d_{12}w/f_2 < 1$$

$$d_{23}w/fw < 0.85$$

3. A small-size zoom lens system according to claim 2, wherein said first lens group comprises negative and positive lenses arranged successively in order from the object side, said negative lens having stronger refracting power on a lens surface thereof closer to the image side, said positive lens comprising a meniscus lens having a convex surface directed toward the object side, the Abbe number $\nu_{1N}$ of said negative lens and the Abbe number $\nu_{1P}$ of said positive lens meeting the following relationship:

$$\nu_{1N} - \nu_{1P} > 17$$

4. A small-size lens according to claim 3, wherein said negative lens comprises a double concave lens.

5. A small-size lens according to claim 3, wherein said negative lens comprises a meniscus lens.

6. A small-size zoom lens system according to claim 2, wherein said first lens group comprises negative and positive lenses arranged successively in order from the object side, said negative lens having stronger refracting power on a lens surface thereof closer to the image side, said positive lens comprising a meniscus lens having a convex surface directed toward the object side, the Abbe number $\nu_{1N}$ of said negative lens and the Abbe number $\nu_{1P}$ of said positive lens meeting the following relationship:

$$\nu_{1N} - \nu_{1P} < 17$$

and wherein said third lens group comprises first positive, second negative, and third negative lenses which are successively arranged in order from the object side, said third negative lens comprising a doublet composed of a negative lens and a positive lens, the Abbe number $\nu_{3N}$ of said negative lens of the doublet and the Abbe number $\nu_{3P}$ of the positive lens of the doublet satisfying the following relationship:

$$\nu_{3N} > \nu_{3P}$$

7. A small-size lens according to claim 6, wherein said negative lens comprises a double concave lens.

8. A small-size lens according to claim 6, wherein said negative lens comprises a meniscus lens.

* * * * *